United States Patent
Wu et al.

(10) Patent No.: US 12,234,849 B2
(45) Date of Patent: Feb. 25, 2025

(54) PRESSABLE LOCATING DEVICE AND DRIVING MECHANISM

(71) Applicant: HANWIT PRECISION INDUSTRIES LTD., New Taipei (TW)

(72) Inventors: Ming-De Wu, New Taipei (TW); Ching-Kai Chang, New Taipei (TW)

(73) Assignee: HANWIT PRECISION INDUSTRIES LTD., New Taipei (TW)

( * ) Notice: Subject to any disclaimer, the term of this patent is extended or adjusted under 35 U.S.C. 154(b) by 689 days.

(21) Appl. No.: 17/510,777

(22) Filed: Oct. 26, 2021

(65) Prior Publication Data

US 2023/0128386 A1    Apr. 27, 2023

(51) Int. Cl.
*F16B 2/04* (2006.01)
*F16B 21/16* (2006.01)

(52) U.S. Cl.
CPC .............. *F16B 2/04* (2013.01); *F16B 21/165* (2013.01)

(58) Field of Classification Search
CPC .... F16B 21/165; F16B 5/0208; F16B 5/0266; F16B 2/04; B23Q 3/18
See application file for complete search history.

(56) References Cited

U.S. PATENT DOCUMENTS

| | | | | | |
|---|---|---|---|---|---|
| 2,521,701 | A | * | 9/1950 | Earle | F16L 37/23 439/348 |
| 3,032,359 | A | * | 5/1962 | Cator | F16L 37/23 439/348 |
| 5,692,851 | A | * | 12/1997 | Pace | F15B 15/261 403/322.2 |
| 6,077,011 | A | * | 6/2000 | Walker | F16B 21/165 24/453 |
| 7,331,813 | B2 | * | 2/2008 | Tsujita | F16B 21/165 439/348 |
| 9,726,963 | B1 | * | 8/2017 | Xiao | F16M 13/02 |
| 10,287,135 | B1 | * | 5/2019 | Tabor | F16B 21/165 |
| 11,859,649 | B2 | * | 1/2024 | Emil | A61B 17/56 |

* cited by examiner

*Primary Examiner* — Matthew R McMahon
(74) *Attorney, Agent, or Firm* — MUNCY, GEISSLER, OLDS & LOWE. P.C.

(57) ABSTRACT

A pressable locating device and a driving mechanism are disclosed. The locating device includes a shaft, a restraining rod and a restraining member; an accommodation space and a shaft hole of a sleeve of the driving mechanism are mounted on the shaft, the restraining rod and the restraining member. The pressing unit is movably assembled in the accommodation space and includes an inner sliding channel disposed on a bottom thereof, and the restraining member and the restraining rod are movably slid in the inner sliding channel. The inner sliding channel includes a through hole formed on a side thereof, and a locating member is axially movable in the through hole, so as to radially move to restrain with or depart from the restraining rod, along the restraining member. An elastic part is disposed and reciprocated between the bottom of the pressing unit and the accommodation space.

9 Claims, 12 Drawing Sheets

PRESSABLE LOCATING DEVICE AND DRIVING MECHANISM

BACKGROUND OF THE INVENTION

1. Field of the Invention

The present invention provides a pressable locating device and a driving mechanism thereof, and more particularly to a locating device which can be used to combine two plates by a pressing manner; when using the locating device, a shaft base is assembled with a first preset plate, a sleeve of the driving mechanism is assembled on a second preset plate, and the sleeve and a pressing unit of the driving mechanism are assemble on the shaft base, so as to achieve the purpose of locating or separating the first preset plate and the second preset plate by operating the pressing unit.

2. Description of the Related Art

Many items for general daily life often apply locating structures (such as screws or pins) for locating items during the reciprocating process; for example, drawers or cabinet panels, which have telescopic structures, usually utilize screw rods or pins to temporarily locate the sliding rails or sliding slots when the sliding rails and sliding slots are moved to predetermined positions, so as to allow the user to perform operation under the stop and locating statuses of the sliding rails and sliding slots. For example, desktop computers, notebook computers, industrial computers or working machines which are made by assembling multiple devices and mechanisms usually utilize screws or pins to locate two plates in a stacked state, so that a plate member which can be movably assembled and disassembled can be disposed on the housing of the mechanism, or multiple devices and mechanisms can be easily assembled or disassembled.

However, a user may be injured inadvertently when touching a tip and thread of the screw and the pin; when disassembling the device, the mechanism or the plate, the user must remove the screws or pins first, and it may cause the problem of losing the screws or pins; when the user does not have backup screws and pins and just use the remaining screw or pin for assembly, it results the unstable assembly status of the mechanism and the plate after assembly, and the assembled mechanism and the plate are easy to loosen and detached. Furthermore, when many screws or pins are placed in the same position after being disassembled, it may not easy to find the corresponding screw or pin for assembly. In addition, a hand tool (such as a screwdriver or a wrench) is required to remove the screws or the pins, and when the types of the screws or pins are different, the user needs to prepare different hand tools, and it may cause the problem that the assembly and disassembly operations become unsmooth. Due to the above-mentioned problems and deficiencies in actual use, using screws or pins to fasten and locate the plates in stack has extremely inconvenient deficiencies.

Figure 11:
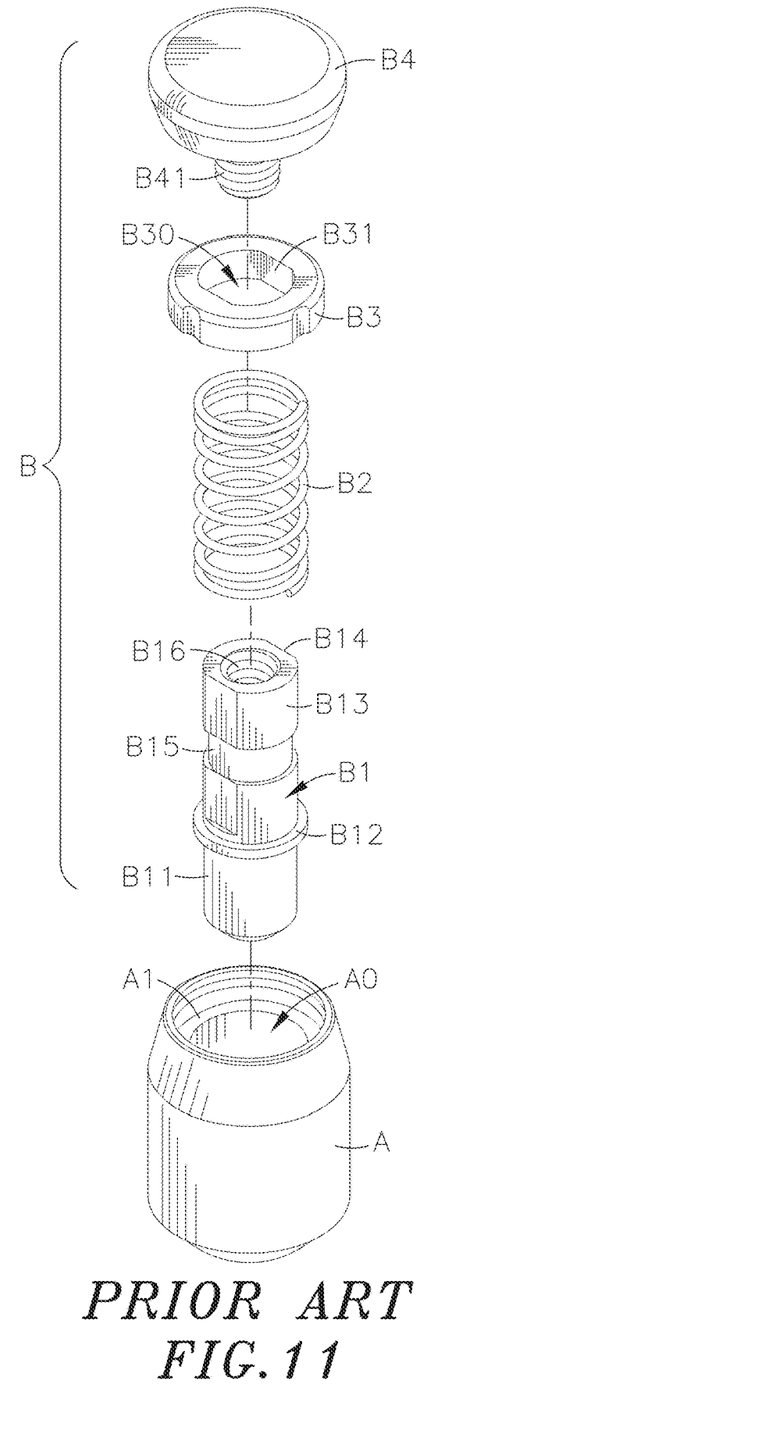
FIG. 11 is a perspective exploded view of a conventional fastening device.
Figure 12:
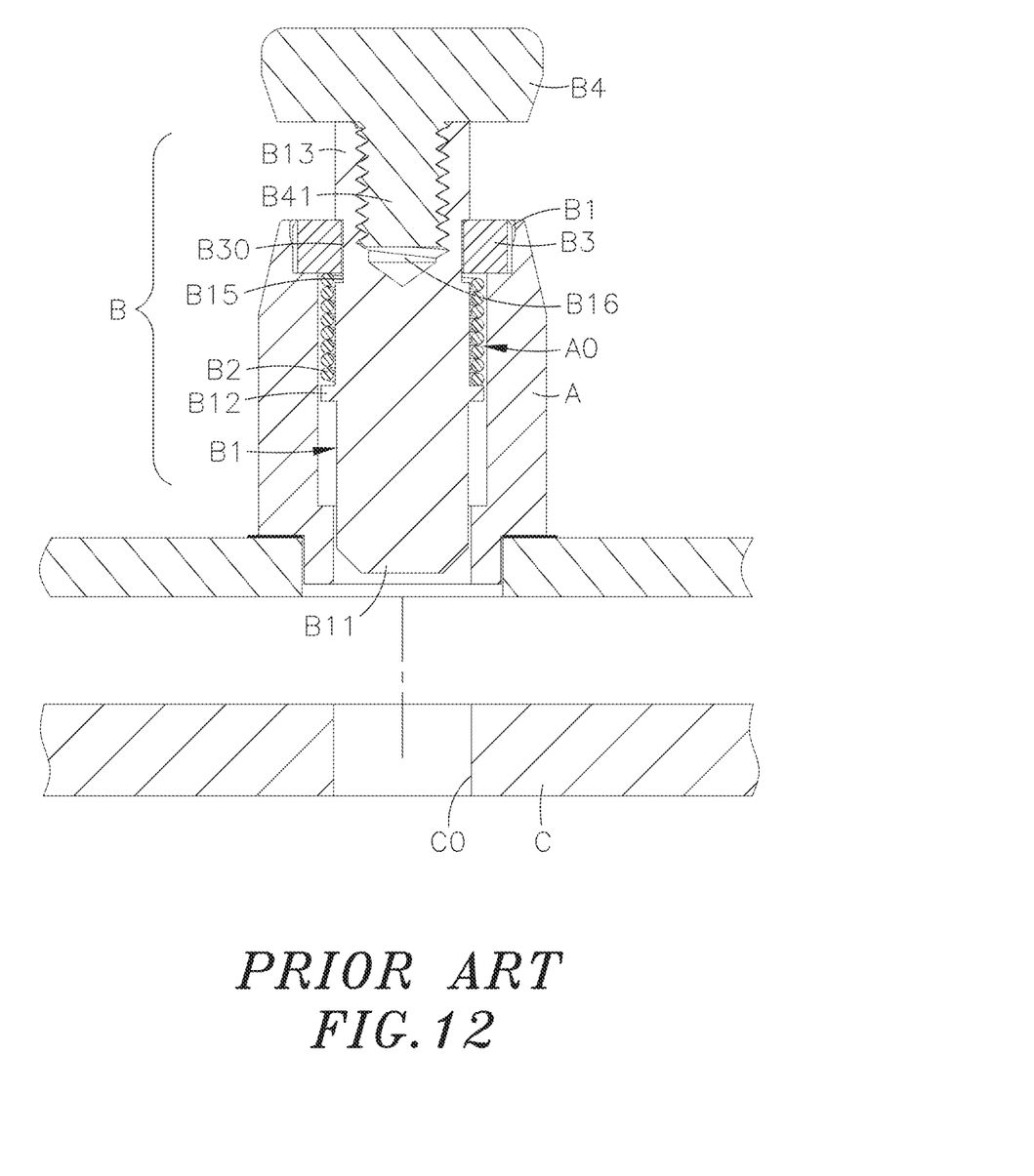
FIG. 12 is a sectional side view of a conventional fastening device.

Please refer to FIGS. 11 and 12. In a conventional fastening device, a base A includes a through hole A0 formed therein, and an accommodating groove A1 recessed on a side of the through hole A0, and a locating rod B1 of a locating rod set B can be inserted through the through hole A0. The locating rod B1 includes an inserting member B11 disposed on a side thereof, a stop ring B12 protruded on the outer edge thereof adjacent to the inserting member B11, and a sliding rod B13 extended from the stop ring B12 toward other side thereof. The sliding rod B13 has two opposite long cut sides B14 formed on an outer edge thereof and cut therethrough axially. The locating rod B1 includes a recessed ring groove B15 formed on a middle section of the sliding rod B13, and an inner screw hole B16 inwardly formed on other side of the sliding rod B13. An elastic member B2 is configured to cover and mount on the sliding rod B13, a side of the elastic member B2 is abutted with the stop ring B12 of the locating rod B1, the other side of the elastic member B2 is abutted with a side of a restraining member B3, and the restraining member B3 is fastened in the accommodating groove A1 of the base A. The restraining member B3 has a restraining hole B30 formed therein, and the restraining hole B30 is in a rectangular groove shape and has two opposite shrinking side edges B31 formed on an inner side thereof, so that long cut sides B14 on two sides of the sliding rod B13 of the locating rod B1 can be aligned to the two shrinking side edges B31 of the restraining member B3 to telescopically move. The inner screw hole B16 on the side of the sliding rod B13 is configured for a screw rod B41 of the side of a rod head B4 to fasten, and the rod head B4 can be exposed out of the base A and used to pull the locating rod B1 to retract into the through hole A0, so as to retract the inserting member B11 on a side of the locating rod B1 into the through hole A0; at this time, the stop ring B12 pushes and compresses the elastic member B2 to the restraining member B3, and the sliding rod B13 is slid in the restraining hole B30 of the restraining member B3. When the recessed ring groove B15 is aligned to the restraining member B3, the rod head B4 can be rotated to drive the locating rod B1 to rotate, to make a rotation direction of the long cut sides B14 on two sides of the sliding rod B13 misalign to the shrinking side edges B31 on two sides of the restraining member B3, so as to fasten the sliding rod B13 in the restraining member B3. Next, the rod head B4 can be rotated again to drive the sliding rod B13 to rotate, the long cut sides B14 are rotated to align the two shrinking side edges B31 of the restraining member B3, so that the locating rod B1 can be pushed to move toward an outer side of the through hole A0 of the base A by the elastic recovering force of the elastic member B2, to expose the inserting member B11 on a side of the locating rod B1 out of the base A.

However, in the above-mentioned conventional fastening device, the restraining member B3 is fastened inside the accommodating groove A1 of the base A and it is not easy to inspect whether the long cut sides B14 on the two sides of the sliding rod B13 are aligned or misaligned to the two shrinking side edges B31 of the restraining member B3, so the user must distinguish an aligning status between the long cut sides B14 on two sides of the sliding rod B13 and the two shrinking side edges B31 of the restraining member B3 upon hand feeling when rotating the rod head B4 to drive the locating rod B1 to rotate, and it causes the blind spot in use and is unfavorable to operate the conventional fastening device. The sliding rod B13 of the locating rod B1 is covered by the elastic member B2, so the locating rod B1 may be shaken and deflected in an unstable status by resistance of the elastic member B2 when the user holds and rotates the rod head B4 to drive the sliding rod B13 of the locating rod B1 to move in the restraining hole B30 of the restraining member B3; furthermore, when the rod head B4 is rotated to align the long cut sides B14 of the sliding rod B13 to the two shrinking side edges B31 of the restraining member B3, the elastic member B2 pushes the locating rod B1 to move out of the through hole A0 of the base A by an elastic force, so the rod head B4 held by the user may suddenly escape from the user's fingers to impact the base A, and directly collide with the base A and the restraining member B3; after the long time use, the above-mentioned problem may cause the base A to skew easily and the locating rod B1 not to directly expose out of the base A to align with a locating hole C0 of a plate C, and it is unfavorable to combine and fasten the two plates C. Therefore, the above-mentioned conventional fastening device has some drawbacks in actual application.

Therefore, how to solve the problem that the conventional fastening device is inconvenient to operate and disadvantageous to assemble and locate two plates is a key issue for the industry.

SUMMARY OF THE INVENTION

In order to solve the conventional problem, the inventors develop a pressable locating device and a driving mechanism of the present invention according to collected data, multiple evaluations and tests, and years of experience in the industry.

An objective of the present invention is that a shaft, a restraining rod and a restraining member having different rod diameters are disposed on a shaft base of a locating device, an accommodation space and a shaft hole of a sleeve of a driving mechanism of the locating device can be disposed in the shaft, the restraining rod and the restraining member, a pressing unit is movably assembled in the accommodation space of the sleeve, and the pressing unit includes an inner sliding channel disposed on a bottom thereof, and the restraining member and the restraining rod are movably slid and inserted in the inner sliding channel; the inner sliding channel includes at least one through hole respectively formed on at least one side and outwardly cut therethrough, at least one locating member is disposed in the at least one through hole, respectively, and each locating member is axially movable along the restraining member and radially move in the through hole to restrain with or depart from the restraining rod. An elastic part is disposed and reciprocated between the bottom of the pressing unit and the accommodation space, so as to achieve the purpose of pressing the driving mechanism to fasten with or separate from the shaft base for the first preset plate and the second preset plate to quickly align and fasten with each other or separate from each other.

Another objective of the present invention is that the shaft base includes a base part disposed on a bottom thereof and configured to fasten in the first locating hole of the first preset plate, the base part includes the shaft, the restraining rod and the restraining member protruded on a central part of a top thereof in a sequential order and having different rod diameters, a rod diameter of the shaft is greater than that of each of the restraining rod and the restraining member, and an outer diameter of the restraining member is greater than the rod diameter of the restraining rod; the restraining member includes a first guiding incline disposed on a bottom thereof and inclined and extended toward the restraining rod, and a second guiding incline disposed on the other side thereof opposite to the first guiding incline and outwardly extended and generally shrunk.

Another objective of the present invention is that the pressing unit of the driving mechanism assembled in the accommodation space of the sleeve includes a releasing button base, a pressing base, a first elastic member and a second elastic member of an elastic part, the releasing button base includes a sliding space formed therein and configured for movable insertion of the pressing unit, a bottom edge of the releasing button base is abutted with a side of the first elastic member, the sliding space includes an exposure hole disposed on a side thereof and outwardly cut therethrough, a guiding incline formed on other side thereof and inwardly shrunk, and a sliding hole formed on other side of the guiding incline opposite to the sliding space and having a shrunk hole diameter. The pressing member of the pressing base is exposed out of the exposure hole of the sliding space, the sliding member on a side of the pressing member is slidably disposed in the sliding space and the sliding hole, the bottom of the sliding member is configured to abut with a side of the second elastic member, and an abutting shoulder part is disposed between the pressing member and the sliding member and configured to abut with an inner side of the exposure hole, and the pressing base includes an inner sliding channel formed therein and configured for the restraining member and the restraining rod to slide therein, and the inner sliding channel includes through holes respectively formed on at least two opposite sides thereof and laterally cut therethrough outwardly. Spherical locating members are movably mounted in the through holes, respectively, and a partial volume of each locating member is exposed out of the through hole and slidable along the sliding space, the guiding incline and the sliding hole, to radially move into or out of the inner sliding channel through the through hole, and slide into or out of the restraining rod along the restraining member, so as to form the restraining or separating status between the driving mechanism and the shaft base.

Another objective of the present invention is that the releasing button base includes a mounting part disposed on an outer edge of the bottom thereof, a side of the first elastic member is mounted and abutted with the mounting part, the sleeve includes a first shoulder part disposed on a bottom of the accommodation space and configured to abut with the other side of the first elastic member, an accommodating groove disposed thereon and having a hole diameter shrunk along the first shoulder part toward a side thereof, a second shoulder part disposed on an inner edge of the accommodating groove and configured to abut with the other side of the second elastic member, and a shaft hole formed on the second shoulder part and cut through the other side thereof.

Another objective of the present invention is that the driving mechanism includes an embedding part disposed on a bottom of the sleeve and configured to fasten with a second locating hole of the second preset plate, and an abutting ring edge formed on other side of the sleeve opposite to the embedding part and protruded toward the accommodation space; the releasing button base includes an outer shoulder edge disposed on an outer part thereof and configured to abut with and restrain the abutting ring edge.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Please refer to FIGS. 1 to 4, which are a perspective view, a perspective exploded view, a perspective exploded view when viewed from another direction, and a sectional side view of a pressable locating device of the present invention. FIGS. 1 to 4 clearly show a pressable locating device and a driving mechanism of the present invention.

As shown in FIGS. 1 to 4, the locating device includes a shaft base 1, and a driving mechanism 2 assembled with a base part 11. The shaft base 1 includes, in a sequential order, a shaft 12, a restraining rod 13, and a restraining member 14; the shaft 12 and the restraining rod 13 are disposed on a central part of the base part 11 and have different rod diameters, and the restraining member 14 is disposed on the other side of the restraining rod 13 opposite to the shaft 12.

The driving mechanism 2 is assembled on the shaft base 1, a pressing unit 3 is movably assembled in a sleeve 21. The sleeve 21 has an accommodation space 210 formed therein and inwardly recessed, and configured to accommodate the pressing unit 3. The sleeve 21 includes a shaft hole 211 formed in the accommodation space 210 and cut through other side thereof, and configured for insertion of the shaft 12 and the restraining rod 13 of the shaft base 1. The pressing unit 3 includes an inner sliding channel 30 disposed on a bottom thereof and configured for the restraining member 14 and the restraining rod 13 to movably slide therein, and the inner sliding channel 30 has at least one through hole 301 respectively formed on at least one side thereof and outwardly cut therethrough. At least one spherical locating member 31 is inserted into the at least one through hole 301, respectively, and axially moved along the restraining member 14 in a vertical direction; the locating member 31 is radially moved in the through hole 301 to restrain with or depart from the restraining rod 13. An elastic part 32 is disposed between the bottom of the pressing unit 3 and the accommodation space 210 in the sleeve 21.

The shaft base 1 includes the base part 11 disposed on a bottom thereof, and the base part 11 includes a joint part 111 disposed on a bottom thereof and configured to fasten with a first locating hole 40 of a first preset plate 4. The shaft base 1 includes, in a sequential order, the shaft 12, the restraining rod 13 and the restraining member 14 protruded on a central part of a top of the base part 11 and having different rod diameters, a rod diameter of the shaft 12 is greater than that of each of the restraining rod 13 and the restraining member 14, and an outer diameter of the restraining member 14 is greater than the rod diameter of the restraining rod 13. The restraining member 14 includes a first guiding incline 141 disposed on a bottom thereof and inclined and extended toward the restraining rod 13, and a second guiding incline 142 formed on other side thereof opposite to the first guiding incline 141 and extended outwardly and shrunk generally.

The driving mechanism 2 includes the pressing unit 3 assembled in the accommodation space 210 of the sleeve 21. The pressing unit 3 includes a releasing button base 33 and a pressing base 34, a first elastic member 321 and a second elastic member 322 of the elastic part 32. The releasing button base 33 includes a sliding space 330 formed therein and configured for movable insertion of the pressing base 34, the bottom edge of sliding space 330 can be abutted with the first elastic member 321, and the releasing button base 33 includes an exposure hole 331 disposed on a side of the sliding space 330 and outwardly cut therethrough, and a guiding incline 332 formed on other side thereof and inwardly shrunk, and a sliding hole 333 formed on other side thereof opposite to the sliding space 330 and having a shrunk hole diameter. The pressing base 34 includes a pressing member 341 disposed thereon and exposed out of the exposure hole 331 of the sliding space 330, and a sliding member 342 linked with a side of the pressing member 341 and slidably disposed in the sliding space 330 and the sliding hole 333. The bottom of the sliding member 342 is configured to abut with a side of the second elastic member 322. The pressing base 34 includes an abutting shoulder part 343 disposed between the pressing member 341 and the sliding member 342 and configured to abut with an inner side of the exposure hole 331. The pressing unit 3 includes the inner sliding channel 30 formed in the pressing base 34 and configured for the restraining member 14 and the restraining rod 13 to slide therein, and the inner sliding channel 30 includes through holes 301 respectively formed on at least two opposite sides thereof and laterally cut therethrough outwardly. Spherical locating members 31 are movably mounted in the through holes 301, respectively, and a partial sphere body of each locating member 31 is exposed out of the through hole 301 and slidable along the sliding space 330, the guiding incline 332 and the sliding hole 333, to radially move into or out of the inner sliding channel 30 through the through hole 301, so as to slide into or out of the restraining rod 13 along the second guiding incline 142 and the first guiding incline 141 of the restraining member 14, to form the restraining or separating status between the driving mechanism 2 and the shaft base 1.

The releasing button base 33 includes a mounting part 334 disposed on an outer edge of a bottom thereof, and a side of the first elastic member 321 is mounted into and abutted with the mounting part 334. The sleeve 21 includes a first shoulder part 212 disposed on a bottom surface of the accommodation space 210 and configured to abut with the other side of the first elastic member 321, an accommodating groove 213 disposed on a side thereof and having a hole diameter shrunk along the first shoulder part 212, a second shoulder part 214 disposed on an inner edge of the accommodating groove 213 and configured to abut with the other side of the second elastic member 322, and the shaft hole 211 formed on the second shoulder part 214 and cut through other side thereof.

The driving mechanism 2 includes an embedding part 22 disposed on the bottom of the sleeve 21 and configured to fasten a second locating hole 50 of a second preset plate 5, and an abutting ring edge 23 disposed on the other side of the sleeve 21 opposite to the embedding part 22 and extended to the accommodation space 210. The releasing button base 33 of the pressing unit 3 includes an outer shoulder edge 335 configured to abut with and restrain the abutting ring edge 23, so as to prevent the releasing button base 33 from escaping from the accommodation space 210 of the sleeve 21, and make the pressing unit 3 vertically movable in the accommodation space 210 of the sleeve 21.

Please refer to FIGS. 2 to 10, which are a perspective exploded view, a perspective exploded view when viewed from another direction, a sectional side view, first to third sectional side views of a press operation, a sectional side view after the press operation, a sectional side view of an unlocking operation, and a sectional side view after the unlocking operation, according to the actual application of the pressable locating device and the driving mechanism of the present invention.

As shown in FIGS. 2 to 10, the base part 11 of the shaft base 1 can be fastened with the first locating hole 40 of the first preset plate 4 by the joint part 111, and the sleeve 21 of the driving mechanism 2 can be fastened with the second locating hole 50 of the second preset plate 5 by the embedding part 22, so that the second preset plate 5, the driving mechanism 2 and the pressing unit 3 can be moved to above the first preset plate 4 and the shaft base 1 at the same time, and the shaft hole 211 of the sleeve 21 can be aligned to the restraining member 14, the restraining rod 13 and the shaft 12 of the shaft base 1; next, the restraining member 14, the restraining rod 13 and the shaft 12 can be inserted into the accommodation space 210 through the shaft hole 211 of the sleeve 21, and then inserted into the sliding hole 333 of the releasing button base 33 and the inner sliding channel 30 of the pressing base 34; as a result, the user can quickly align the second preset plate 5 to the first preset plate 4, and then press the second preset plate 5 toward the first preset plate 4, and then press the pressing member 341 of the pressing unit 3 to vertically downwardly move the pressing base 34 along the sliding space 330 of the releasing button base 33, and downwardly slide the inner sliding channel 30 of the pressing base 34 along the restraining member 14 and the restraining rod 13; when the side of the sphere body of the locating members 31 in the through hole 301 on two sides of the inner sliding channel 30 are slid along the second guiding incline 142 of the restraining member 14, other side of the sphere body of the locating members 31 are slid by abutting the guiding incline 332 of the releasing button base 33, the locating members 31 can enter the first guiding incline 141 cross the second guiding incline 142; at this time, the user can apply force on the pressing member 341 to slide the locating member 31 into the sliding hole 333, which has the shrunk hole diameter, along the guiding incline 332, so that the locating member 31 is pushed by the sliding hole 333 in a radial direction to slide along the first guiding incline 141 and lateral move to abut with the outer edge of the restraining rod 13; at this time, the releasing button base 33 is pushed by the first elastic member 321 to move toward the outer side of the accommodation space 210 of the sleeve 21, and the outer shoulder edge 335 is abutted with the abutting ring edge 23 of the top of the accommodation space 210, the pressing member 341 of the pressing base 34 enters the sliding space 330 through the exposure hole 331, so that the locating members 31 are restrained and located with the restraining rod 13 and the sliding hole 333; at this time, the releasing button base 33 is abutted against the first elastic member 321 of the elastic part 32, the pressing base 34 is abutted against the second elastic member 322, so as to achieve the purpose of pressing the driving mechanism 2 to fasten with the shaft base 1 to locate the second preset plate 5 on the first preset plate 4.

Figure 1:
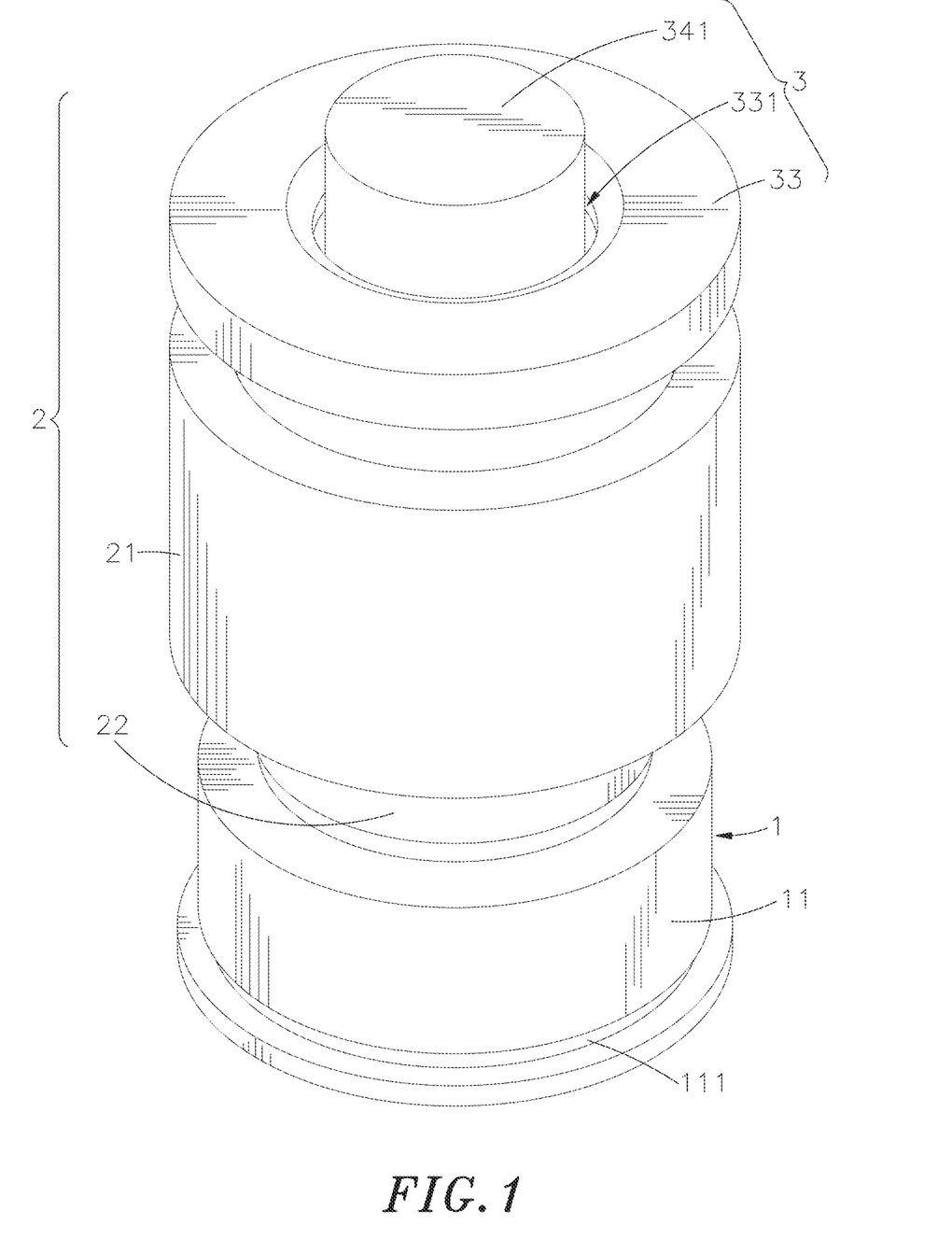
FIG. 1 is a perspective view of a pressable locating device of the present invention.
Figure 2:
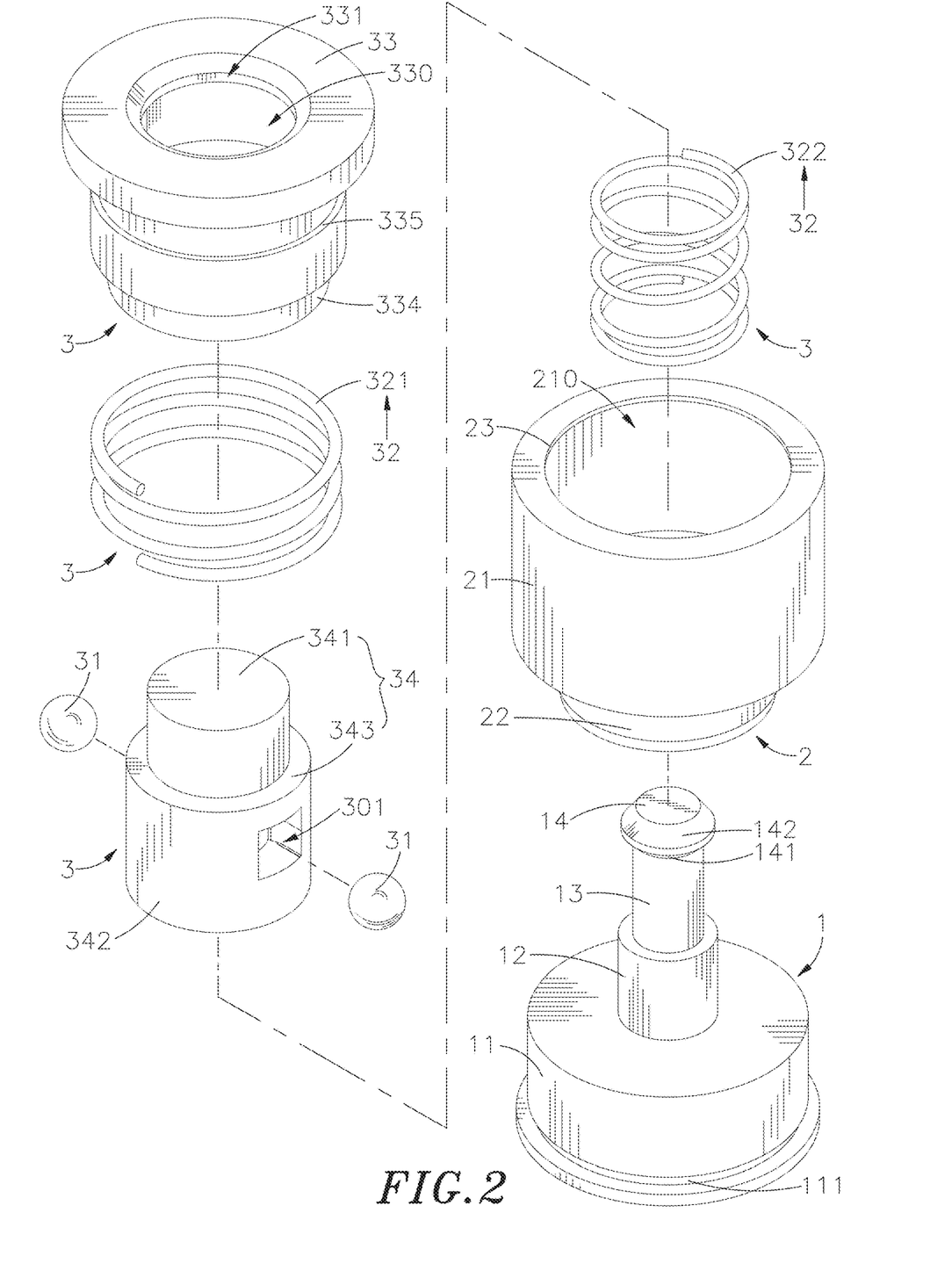
FIG. 2 is a perspective exploded view of a pressable locating device of the present invention.
Figure 3:
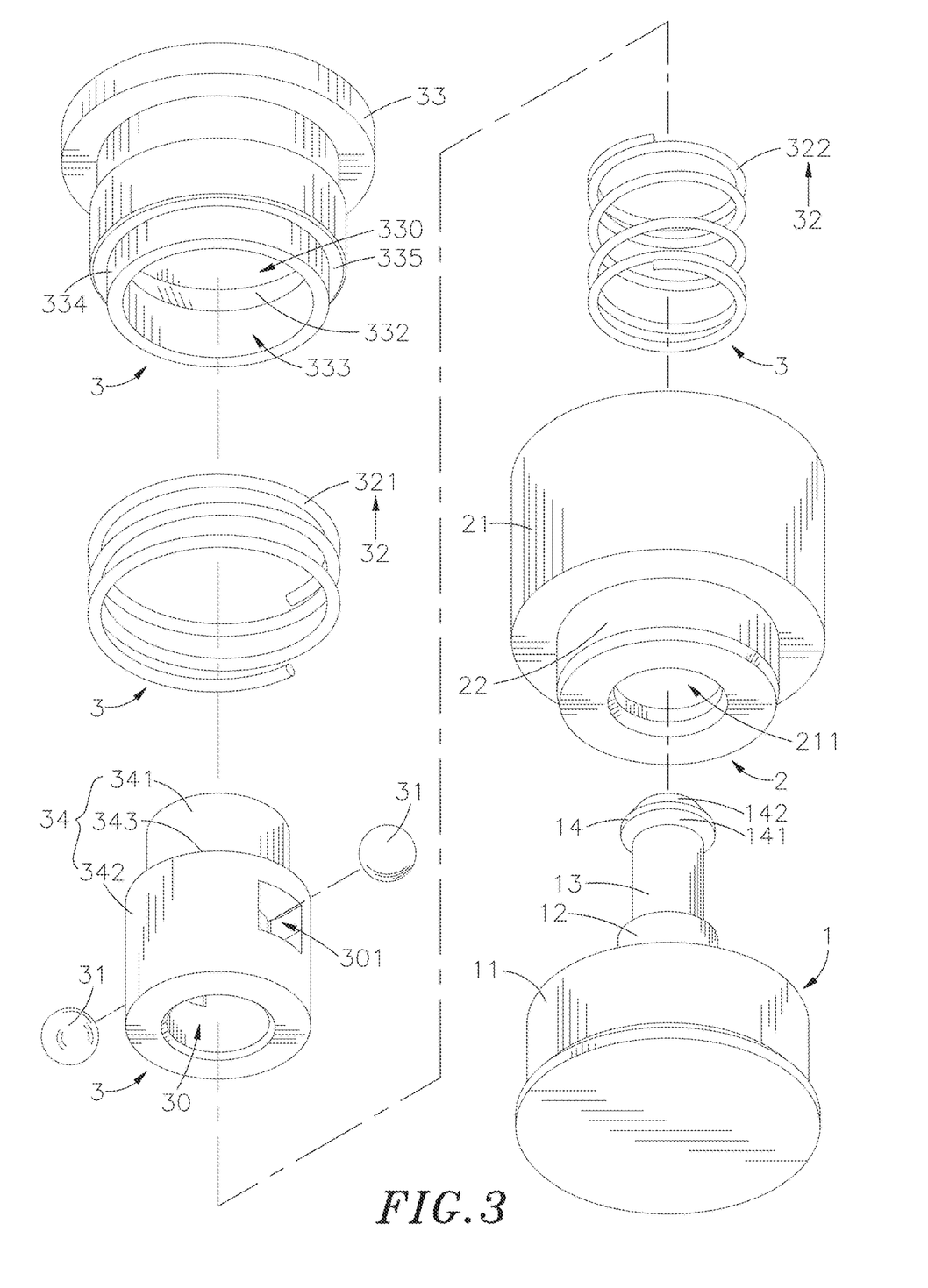
FIG. 3 is a perspective exploded view of a pressable locating device of the present invention, when viewed from another direction.
Figure 4:
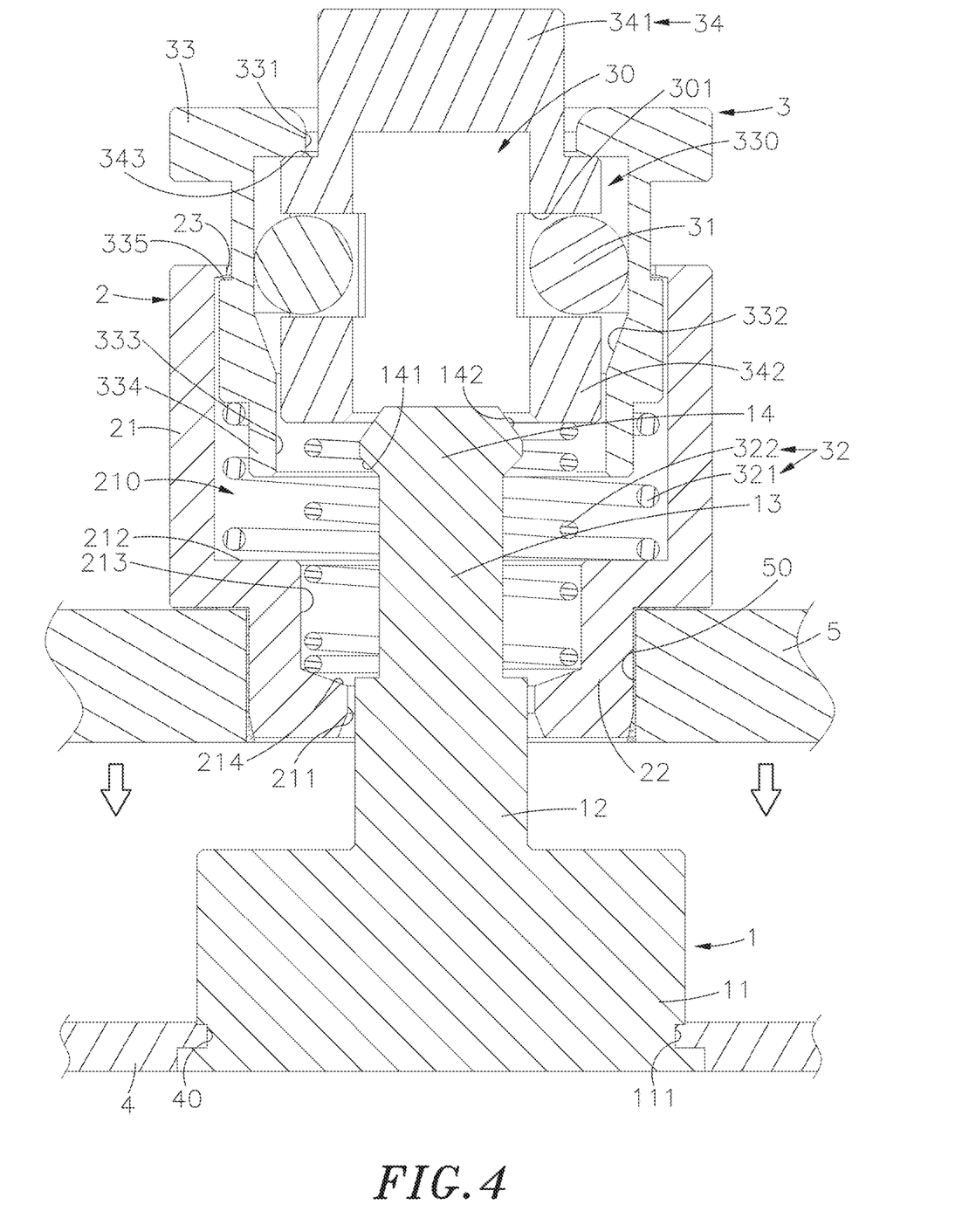
FIG. 4 is a sectional side view of a pressable locating device of the present invention.
Figure 5:
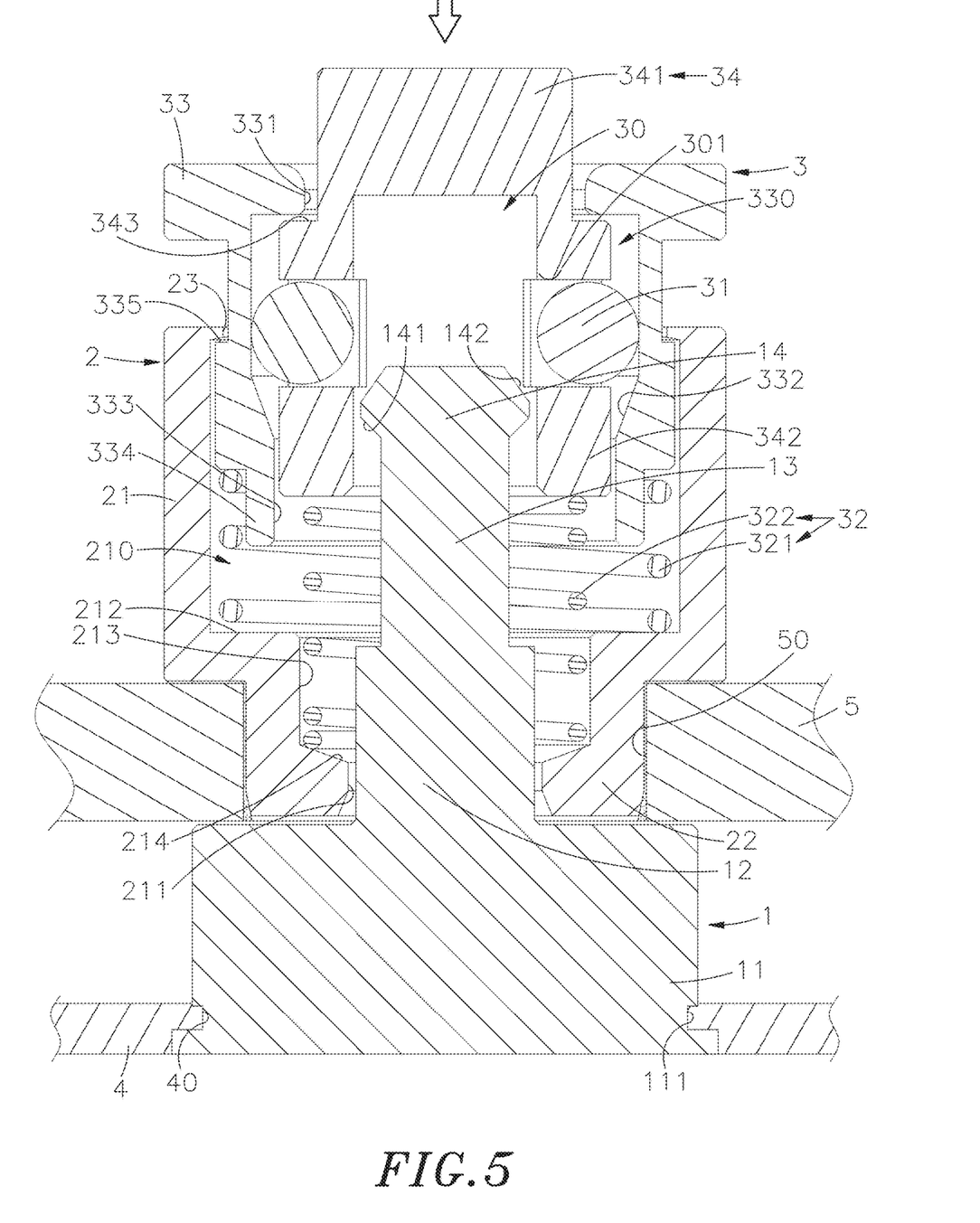
FIG. 5 is a first sectional side view of a pressable locating device of the present invention, when the pressable locating device is being pressed.
Figure 6:
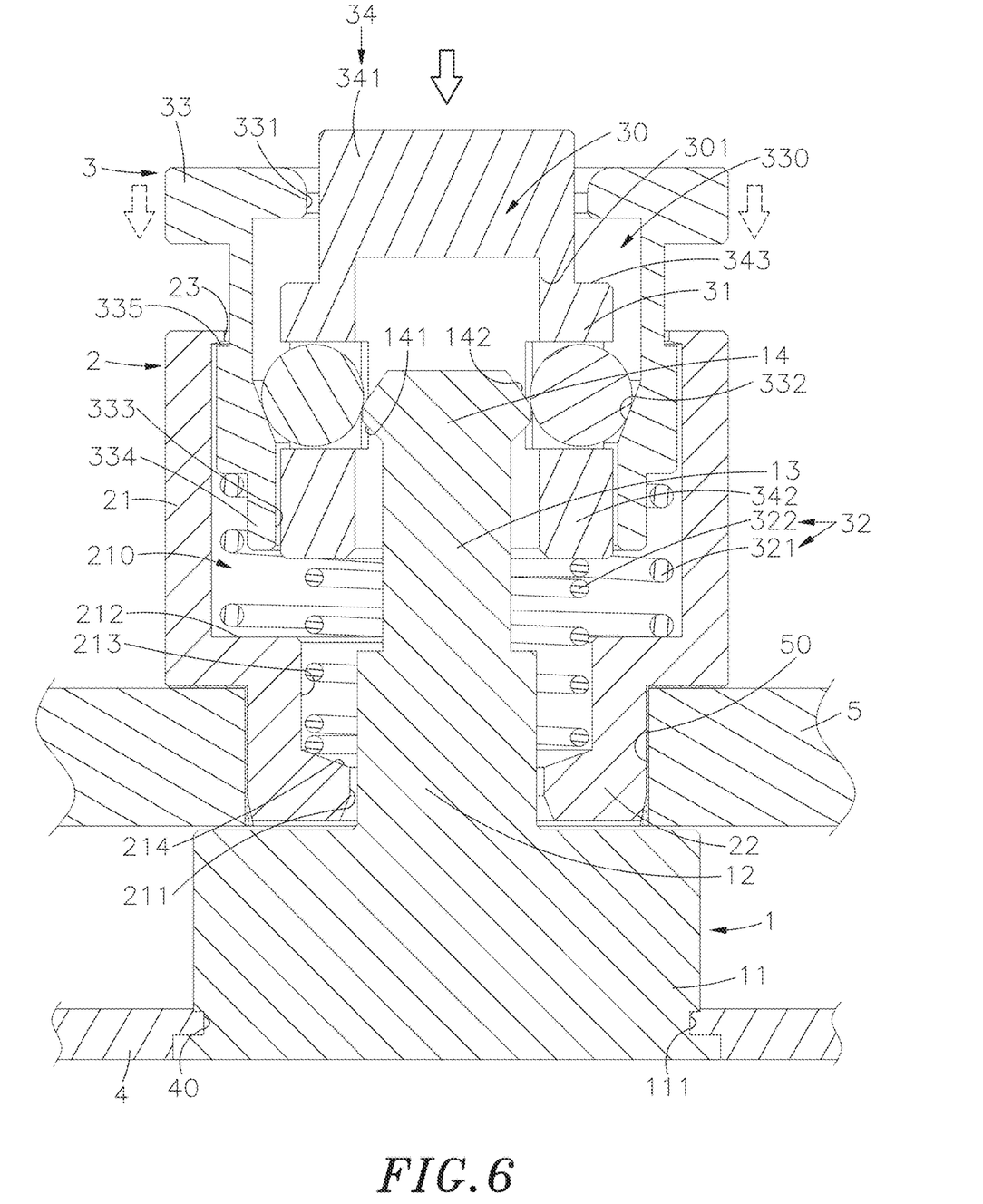
FIG. 6 is a second sectional side view of the pressable locating device of the present invention, when the pressable locating device is being pressed.
Figure 7:
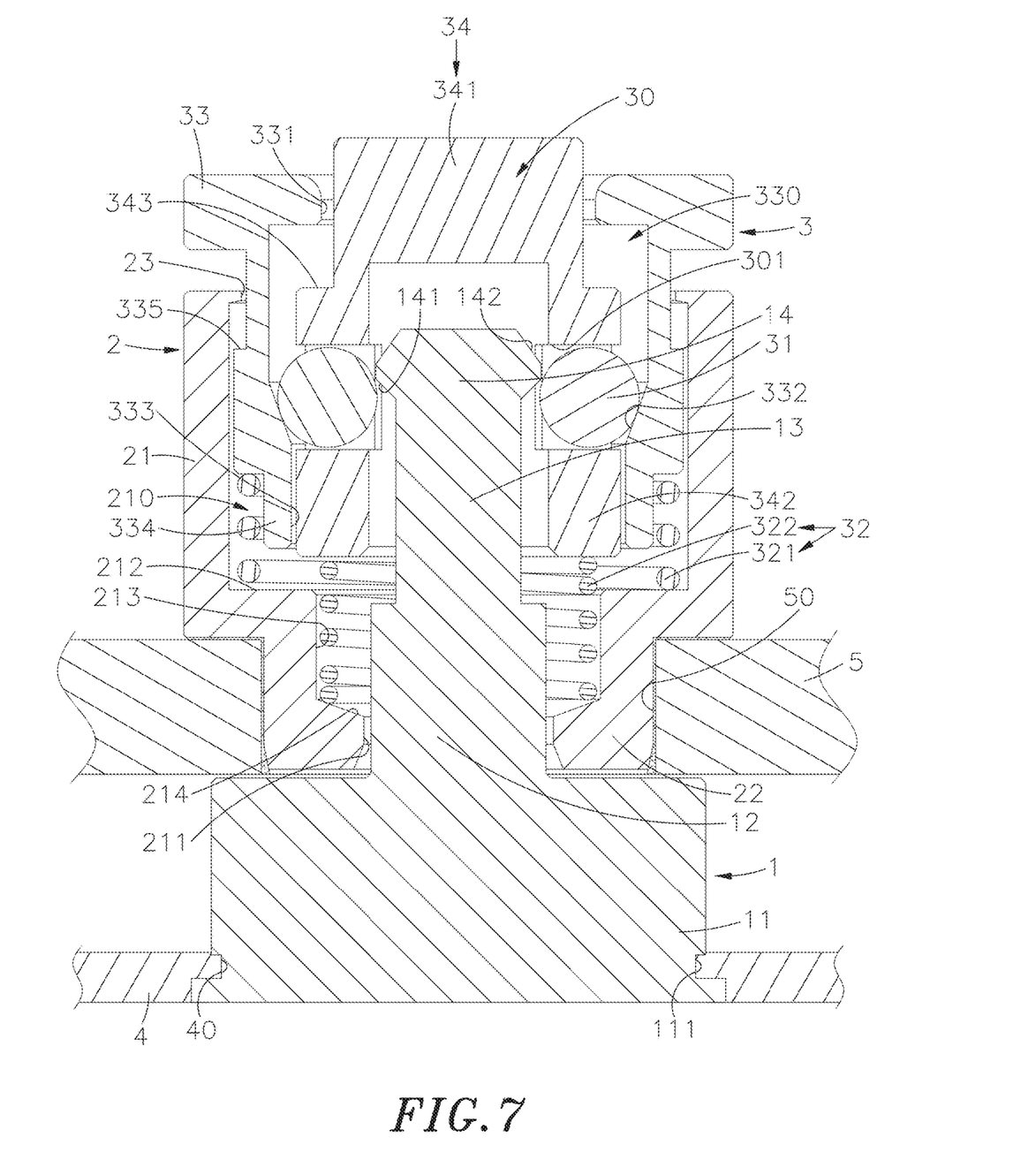
FIG. 7 is a third sectional side view of the pressable locating device of the present invention, when the pressable locating device is being pressed.
Figure 8:
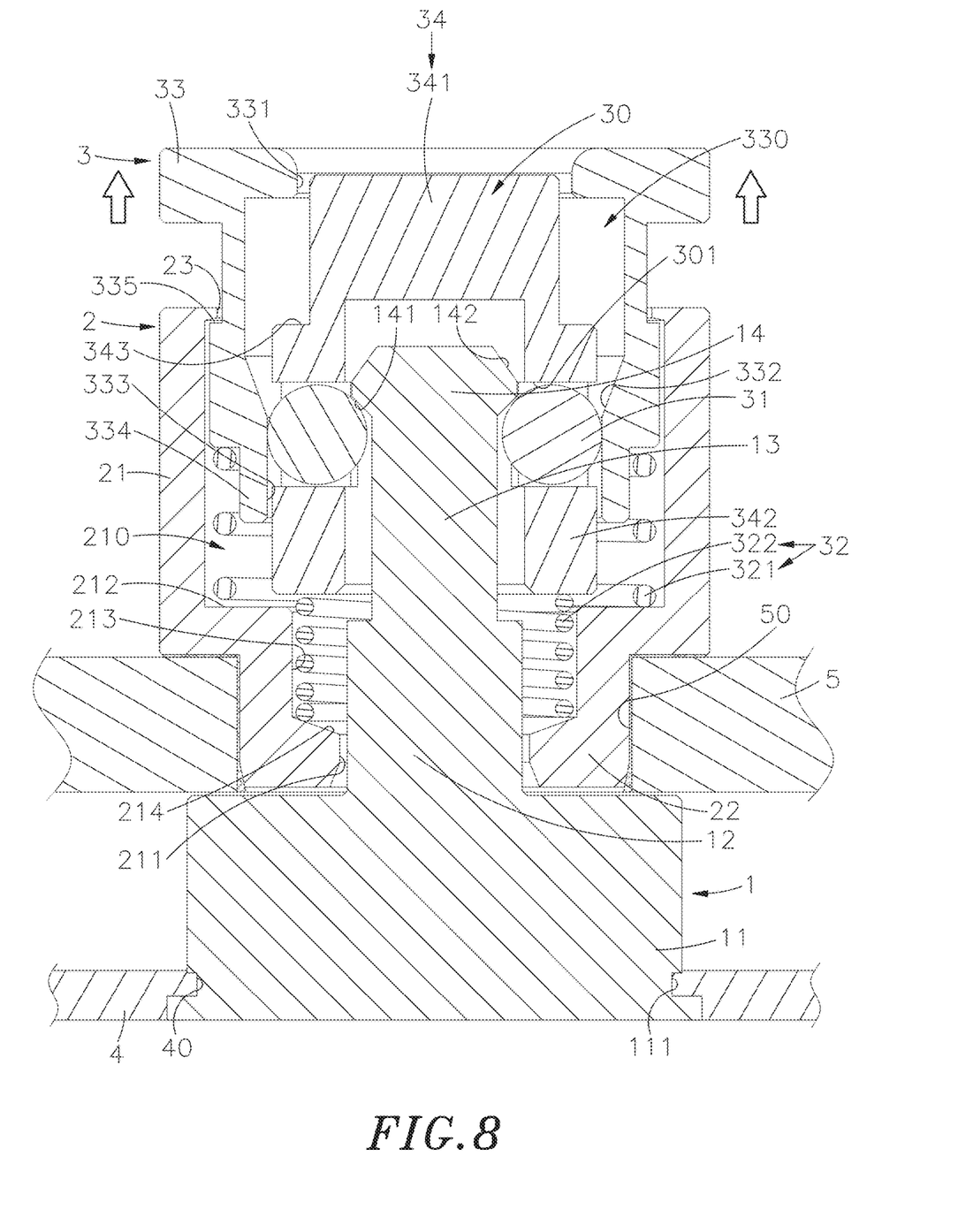
FIG. 8 is a sectional side view of a pressable locating device of the present invention after the pressable locating device is pressed.
Figure 9:
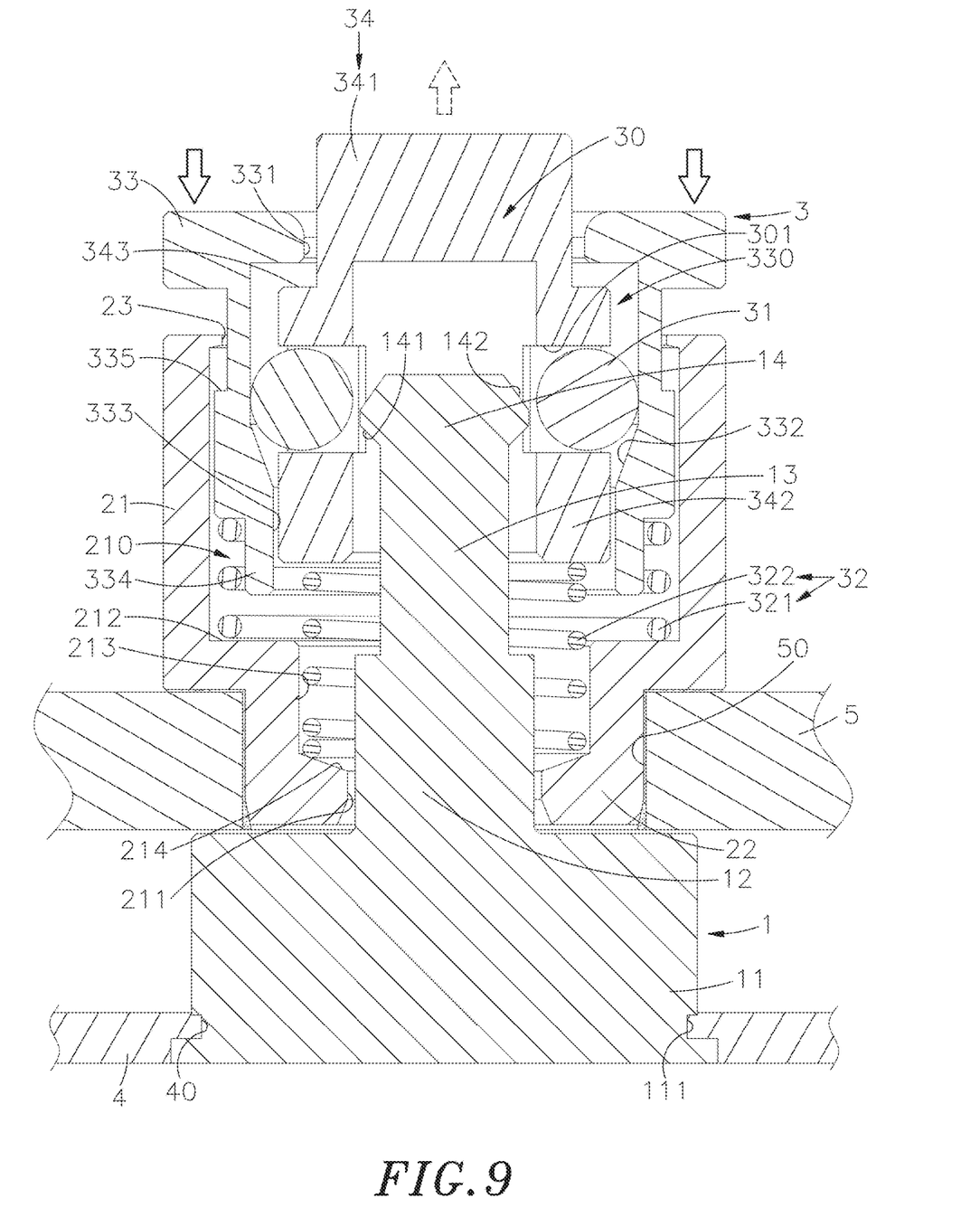
FIG. 9 is a sectional side view of a pressable locating device of the present invention, when the pressable locating device is being unlocked.
Figure 10:
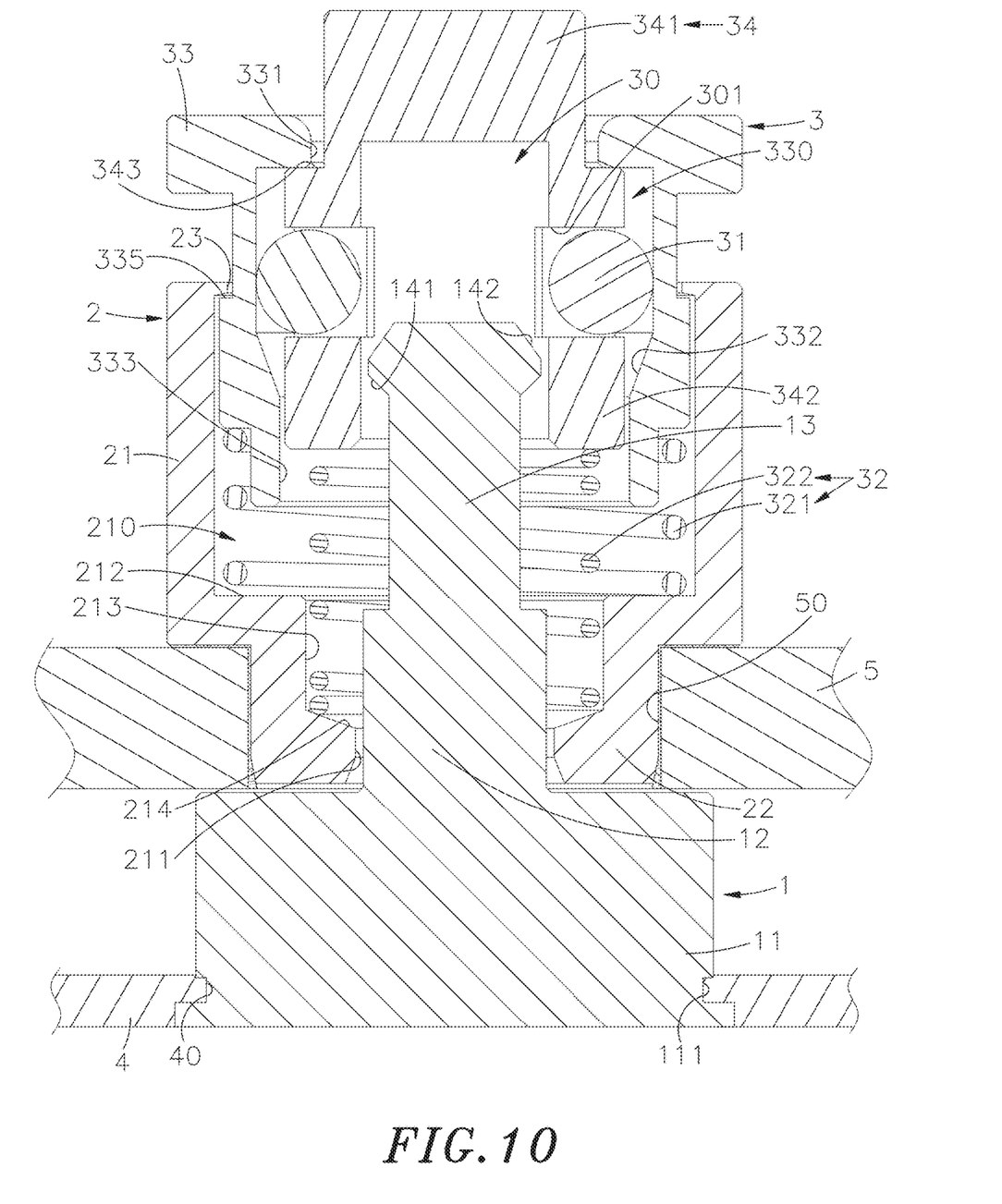
FIG. 10 is a sectional side view of a pressable locating device of the present invention, after the pressable locating device is unlocked.

In order to separate the second preset plate 5 from the first preset plate 4, the user can press the top of the releasing button base 33 to downwardly move the releasing button base 33 toward the accommodation space 210 of the sleeve 21, and make the sliding hole 333 of the releasing button base 33 downwardly slide along the sliding member 342 and make the guiding incline 332 of the releasing button base 33 slide to the outer side of the locating member 31; next, the user can then release the force applied on the releasing button base 33, and the releasing button base 33 is pushed by the elastic recovering force of the first elastic member 321 of the elastic part 32, the pressing base 34 is pushed by the elastic recovering force of the second elastic member 322, so as to radially move the locating member 31 toward outer side along the first guiding incline 141 of the restraining member 14, to slide into the sliding space 330 along the second guiding incline 142 and the guiding incline 332; at this time, each locating member 31 is moved away from the restraining rod 13 and moved to above the restraining member 14 to make the pressing member 341 of the pressing base 34 extend out of the exposure hole 331 of the releasing button base 33, to separate the driving mechanism 2 from the shaft base 1, so as to separate the second preset plate 5, the driving mechanism 2 and the pressing unit 3 from the shaft base 1 and the first preset plate 4, thereby achieving purpose of conveniently separating the second preset plate 5 from the first preset plate 4.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A pressable locating device for a first preset plate and a second preset plate to assemble with or separate from each other, comprising:
   a shaft base comprising a shaft, a restraining rod, and a restraining member, wherein the shaft and the restraining rod have different rod diameters, and the restraining member is disposed on a side of the restraining rod opposite to the shaft; and
   a driving mechanism assembled on the shaft base, and comprising a sleeve surrounding the shaft and the restraining rod of the shaft base, and a pressing unit movably assembled inside the sleeve, wherein the sleeve comprises an accommodation space formed therein and configured to receive the pressing unit, and a shaft hole formed in the accommodation space and configured for insertion of the shaft and the restraining rod, wherein the pressing unit comprises an inner sliding channel formed on a bottom thereof, and the restraining member and the restraining rod are slidably disposed in the inner sliding channel, the inner sliding channel has at least one through hole respectively formed on at least one side thereof and outwardly cut therethrough, wherein at least one locating member is disposed in the at least one through hole, respectively, and axially movable along the restraining member, and the at least one locating member is radially moved to restrain with or depart from the restraining rod in the at least one through hole, and the pressing unit comprises an elastic part disposed and reciprocated between the bottom of the pressing unit and the accommodation space;
   the pressing unit comprising a releasing button base, a pressing base, a first elastic member and a second elastic member of the elastic part, wherein the releasing button base and the pressing base each extend out of an end of the sleeve such that they can be engaged by a user from an outside of the sleeve;
   wherein a pressing member of the pressing unit can be pressed by the user to vertically downwardly move the pressing base along a sliding space of the releasing button base, and downwardly slide along the restraining member and the restraining rod, allowing the at least one locating member to engage with the restraining member, to thereby fasten the shaft base to the driving mechanism;
   wherein when the user presses the releasing button base against an elastic force of the first elastic member, the releasing button base will downwardly move toward the accommodation space of the sleeve, allowing the at least one locating member to disengage from the restraining member, and then the pressing base is pushed by an elastic recovering force of the second elastic member to achieve releasing and separation of the shaft base from the driving mechanism.

2. The pressable locating device according to claim 1, wherein the shaft base comprises a base part disposed on a bottom thereof and fastened with the first preset plate, wherein the shaft, the restraining rod, and the restraining member are protruded on a top of the base part in a sequential order.

3. The pressable locating device according to claim 2, wherein the shaft, the restraining rod, and the restraining member, which have different rod diameters, are protruded on a central part of a top of the base part, a rod diameter of the shaft is greater than that of each of the restraining rod and the restraining member, and an outer diameter of the restraining member is greater than a rod diameter of the restraining rod, wherein the restraining member comprises a first guiding incline formed on a bottom thereof and obliquely extended toward the restraining rod, and a second guiding incline formed on the other side thereof opposite to the first guiding incline and outwardly extended and generally shrunk.

4. The pressable locating device according to claim 1, wherein the releasing button base of the pressing unit comprises the sliding space formed therein and configured for movable insertion of the pressing base, and a bottom edge configured to abut with the first elastic member, wherein the releasing button base comprises an exposure hole disposed on a side of the sliding space and outwardly cut therethrough, a guiding incline formed on the other side of the sliding space and inwardly shrunk, and a sliding hole formed on the other side thereof opposite to the sliding space and having a shrunk hole diameter, wherein the pressing base comprises the pressing member disposed thereon and exposed out of the exposure hole of the sliding space, and a sliding member disposed on a side thereof and slidably disposed in the sliding space and the sliding hole, a bottom of the sliding member is configured to abut with a side of the second elastic member, and the pressing base comprises an abutting shoulder part disposed between the pressing member and the sliding member and abutted with an inner side of the exposure hole, and the pressing base comprises the inner sliding channel disposed therein, and the restraining member and the restraining rod are slidably disposed in the inner sliding channel, the inner sliding channel comprises at least two of the through holes laterally outwardly passed through at least two opposite sides thereof, respectively, and a locating member is movably disposed in each of the through holes, respectively, and each locating member is in a spherical shape.

5. The pressable locating device according to claim 4, wherein the releasing button base comprises a mounting part disposed on an outer edge of the bottom thereof and configured to abut with a side of the first elastic member, the sleeve comprises a first shoulder part disposed on a bottom surface of the accommodation space and configured to abut with the other side of the first elastic member, an accommodating groove having a hole diameter shrunk toward a side along the first shoulder part, a second shoulder part disposed on an inner edge of the accommodating groove and configured to abut with the other side of the second elastic member, and the shaft hole formed on the other side of the second shoulder part, wherein a partial volume of the at least one locating member is exposed out of the at least one through hole and slidable along the sliding space, the guiding incline and the sliding hole, and radially movable into or out of the inner sliding channel through the at least one through hole, and slidable into or out of the restraining rod along the restraining member to restrain with or separate from the restraining rod.

6. The pressable locating device according to claim 1, wherein the driving mechanism comprises an embedding part disposed on a bottom of the sleeve and configured to fasten with the second preset plate, an abutting ring edge formed on the other side of the sleeve opposite to the embedding part and protruded toward the accommodation space, and the releasing button base comprises an outer shoulder edge disposed on an outer part thereof and configured to abut with and restrain the abutting ring edge.

7. A driving mechanism of a pressable locating device for a first preset plate and a second preset plate to assemble with or separate from each other, comprising:
   a sleeve comprising an accommodation space, and a shaft hole formed in the accommodation space and cut through the other side thereof; and
   a pressing unit movably assembled in the accommodation space of the sleeve, and comprising an elastic part disposed and reciprocated between the bottom of the pressing unit and the accommodation space, an inner sliding channel formed on a bottom thereof and inwardly recessed, and a through hole formed on at least one side of the inner sliding channel and outwardly cut therethrough, and a locating member disposed in the at least one through hole and radially movable to separate from a restraining rod;
   the pressing unit comprising a releasing button base, a pressing base, a first elastic member and a second elastic member of the elastic part, wherein the releasing button base and the pressing base each extend out of an end of the sleeve such that they can be engaged by a user from an outside of the sleeve;
   wherein a pressing member of the pressing unit can be pressed by the user to vertically downwardly move the pressing base along a sliding space of the releasing button base, and downwardly slide along the restraining member and the restraining rod, allowing the locating member to engage with the restraining member, to thereby fasten the restraining rod to the driving mechanism;
   wherein when the user presses the releasing button base against an elastic force of the first elastic member, the releasing button base will downwardly move toward the accommodation space of the sleeve, allowing the locating member to disengage from the restraining member, and then the pressing base is pushed by an elastic recovering force of the second elastic member to achieve releasing and separation of the restraining rod from the driving mechanism.

8. The driving mechanism according to claim 7, wherein the releasing button base of the pressing unit comprises the sliding space formed therein and configured for movable insertion of the pressing base, and a bottom edge configured to abut with the first elastic member, wherein the releasing button base comprises an exposure hole disposed on a side of the sliding space and outwardly cut therethrough, a guiding incline formed on the other side of the sliding space and inwardly shrunk, and a sliding hole formed on the other side thereof opposite to the sliding space and having a shrunk hole diameter, wherein the pressing base comprises the pressing member disposed thereon and exposed out of the exposure hole of the sliding space, and a sliding member disposed on a side thereof and slidably disposed in the sliding space and the sliding hole, a bottom of the sliding member is configured to abut with a side of the second elastic member, and the pressing base comprises an abutting shoulder part disposed between the pressing member and the sliding member and abutted with an inner side of the exposure hole, and the pressing base comprises the inner sliding channel disposed therein, and the restraining member and the restraining rod are slidably disposed in the inner sliding channel, the inner sliding channel comprises at least two through holes laterally outwardly passed through at least two opposite sides thereof, respectively, and a locating member is movably disposed in each through hole, respectively, and each locating member is in a spherical shape.

9. The driving mechanism of the pressable locating device according to claim 8, wherein the releasing button base comprises a mounting part disposed on an outer edge of the bottom thereof and configured to abut with a side of the first elastic member, the sleeve comprises a first shoulder part disposed on a bottom surface of the accommodation space and configured to abut with the other side of the first elastic member, an accommodating groove with a hole diameter shrunk toward a side along the first shoulder part, a second shoulder part disposed on an inner edge of the accommodating groove and configured to abut with the other side of the second elastic member, and the shaft hole formed on the other side of the second shoulder part; wherein a partial volume of each locating member is exposed out of each through hole and slidable along the sliding space, the guiding incline and the sliding hole, and radially movable into or out of the inner sliding channel through the through hole, and slidable into or out of the restraining rod along the restraining member, to restrain with or separate from the restraining rod, wherein the driving mechanism comprises an embedding part disposed on a bottom of the sleeve and configured to fasten with the second preset plate, an abutting ring edge formed on the other side of the sleeve opposite to the embedding part and protruded toward the accommodation space, and the releasing button base comprises an outer shoulder edge disposed on an outer part thereof and configured to abut with and restrain the abutting ring edge.

* * * * *